Patented Feb. 21, 1933

1,898,966

UNITED STATES PATENT OFFICE

ADOLF SPILKER, OF DUISBURG-MEIDERICH, GERMANY

HYDROGENATION OF HYDROCARBONS

No Drawing. Application filed May 4, 1931, Serial No. 535,089, and in Germany June 25, 1928.

This invention relates to hydrogenation of hydrocarbons, and in such hydrogenation to a new and improved method for the preparation of apparatus for hydrogenation, to an apparatus so prepared and to a method of hydrogenation involving the use of apparatus so prepared.

It has been found that the reduction of hydrocarbons of the heavier types to low boiling hydrocarbons by hydrogenation can be carried on with an increased yield of valuable low boiling hydrocarbons by the use of activated reaction vessels. These vessels or stills may be of any type and metal suitable to withstand the pressures and temperatures, but it has been found that iron or steel vessels are particularly suitable for activation. As an activation agent small quantities of iodine or of iodine compounds which are easily dissociable or dissociable under the conditions of the reaction have been found suitable.

It is an object of the present invention to provide a new and improved method and apparatus for the hydrogenation of hydrocarbons.

It is a further object to provide a new and improved method of using a catalytic agent in the hydrogenation of hydrocarbons.

It is an additional object to provide a method of preparing a reaction vessel for use in hydrogenation.

Other and further objects will appear as the description proceeds.

It has been found that in the treatment of hydrocarbons by hydrogenation under high pressure and high temperatures (about 250–500 degrees C.) the yield in valuable liquid hydrocarbons can be considerably increased by activating, from time to time, the metallic reaction vessels by means of small quantities of iodine or easily dissociable iodine compounds. Also, this activity will not be destroyed by rinsing with water or benzol.

For this preactivation, temperatures in excess of 250 degrees C. and pressures in excess of 50 atmospheres have been found suitable, and are within the purview of this invention; particularly pressures of over 100 atmospheres and temperatures over 400 degrees C.

For example, a small grain of iodine is placed in a 5-liter autoclave, and the vessel is filled with hydrogen at an initial pressure of approximately 100 atmospheres. The vessel is then heated to approximately 500 degrees C. for a period of approximately five hours. After cooling, the gas is blown off and the autoclave is repeatedly and thoroughly rinsed with benzol and hot water.

Then 500 grams of naphthalene are treated for two hours at 470 degrees C. under an initial hydrogen pressure of 125 atm. without further addition of iodine. The naphthalene is completely liquefied. Even after ten such experiments liquefaction took place without residue.

Simultaneously with the activating, treatment by means of hydrogenation can be undertaken with the same success. The results obtained in the continual method of working are even more favorable.

Example I

An autoclave as mentioned above is filled with 10 kilograms of dry, crude naphthalene. Next, hydrogen which need not be pure is introduced under a pressure of 125 atm. and the whole is subjected to a temperature of 470 degrees C. The pressure which in the beginning rises in conformity with the increase of the temperature will soon, at about 380 degrees C., go down, a sign that hydrogen has been absorbed. After cooling, additional quantities of hydrogen can be forced in and by further heating the reaction can be continued or completed, as the case may be.

The result of the process is a mixture of low-boiling benzol hydrocarbons and tetralin, together with an admixture of decalin and other hydrocarbons.

The ten kilograms of crude naphthalene are transformed into 8 kilograms of liquid hydrocarbons, boiling up to 200 degrees C., in addition to 1.5 kilograms of unchanged naphthalene, with a loss of 0.5 kilogram of gaseous matter, while only 2.5–3.0 kilograms of liquid hydrocarbons are formed if the apparatus used has not been activated by iodine.

Example II

Ten kilograms of ordinary anthracite-tar pitch are treated as in Example I. The reaction temperature is 475 degrees C. Beside an abundant amount of ammoniac, 20% of liquid hydrocarbons boiling up to 200 degrees C. are formed, another 30% of higher boiling fractions, 10% of products of the nature of lubricating oils, and 4% water containing ammonia, with 28% of residual matter and a loss of 8% of gaseous matter.

The low-boiling substances can be used, the same as benzol or gasoline, as fuel for internal combustion engines. The higher-boiling fractions yield very good Diesel engine fuel; while the highest fractions can be used as lubricants.

The purification of the individual fractions by the methods known to the petroleum and anthracite tar industries offers no difficulties, on the contrary, it can be carried out easily and with small losses, and can often be entirely omitted.

Naturally, the process can be carried out continually or intermittently, and likewise in such a manner that the low-boiling products together with the gaseous products formed and the unused hydrogen are distilled off continuously, while the latter, after condensation of the condensable products, may be used anew in the reaction.

Example III

Six kilograms of a powdered coal rich in volatile combustible matter mixed with 3 kilograms of crude tar oil are treated as in Example I.

The amounts of products obtained vary slightly with the conditions under which the experiment is carried out; e. g. with an initial pressure of 125 atm. and a reaction temperature of 475 degrees C., about 10% water, about 31% of a low-boiling substance of the nature of benzine or benzol, 15% middle oil, and about 6% of lubricating oil, are obtained. The residue, consisting of pitch and unusued coal, amounts to about 27%, while the working loss and the loss due to vaporization amount to about 11%. (Percentages are based on the amount of coal used.) Either brown lignites and the like, or brown lignite tars, shale oil, petroleum, etc., or tar distillates and petroleum distillates may also be used as distributing agents. Using apparatus which has not been activated, only about 20% of the valuable low-boiling hydrocarbons are formed.

Example IV

Ten kilograms of carbolic acid are treated as in Example 1. Seven kilograms of benzol is obtained. The remaining three kilograms of carbolic acid can be returned into circulation for further treatment. The water formed is derived from the OH-groups split off.

The apparatus retains its activity for a long time so that the yield remains essentially the same. At least 5–10 charges may thus be subjected to treatment by hydrogenation without reduction of activity. In many cases it continues for longer.

Instead of the iodine, organic or inorganic compounds of iodine may be used, such as iodoxybenzene, mercury iodide, likewise cadmium iodide and similar substances.

The products of the reaction vary according to the raw materials used and the manner and duration of treatment; the low-boiling fractions consist essentially of benzol and its homologues, and derivatives of these substances rich in hydrogen, while the high-boiling fractions consist of hydrogenated naphthalene, anthracene, etc.

The invention is applicable to the hydrogenation of other hydrocarbons than those specifically given in the examples. It is applicable particularly to petroleum in its crude forms or to petroleum residues or intermediate products of other processes for the treatment of petroleum. The process may be carried on continuously or intermittently and the vessel or pipe still, or other apparatus, may be activated before the start of the hydrogenation or sufficient activating material may be incorporated with the charge or flow through with the material being treated in a continuous process.

The specific examples disclosed are to be understood as illustrative only, and such changes and modifications are contemplated as come within the spirit and scope of the appended claims.

I claim:

1. The method of hydrogenating and splitting bituminous materials which comprises subjecting a metallic surface having the effect of iron to heat and pressure in the presence of iodine, and thereafter bringing a bituminous material substantially free of iodine into contact with said activated surface at a temperature in excess of 250 degrees C. and under high pressure and in the presence of a hydrogen-containing gas.

2. The method of producing low-boiling hydrocarbons from high-boiling hydrocarbons, which comprises preactivating a metallic surface having the effect of iron by subjecting it to heat and pressure in the presence of iodine, and thereafter bringing high-boiling hydrocarbons substantially free of iodine into contact with said activated surface, under heat and high pressure in the presence of a hydrogen-containing gas.

3. The method of hydrogenating bituminous materials which comprises heating in excess of 250 degrees C. under increased pressure in the presence of iodine a metallic surface having the effect of iron whereby to activate the surface, and thereafter bringing a bituminous material substantially free of iodine into contact with said activated surface at a temperature in excess of 250 degrees C. and at a pressure of a hydrogen-containing gas in excess of 125 atmospheres.

4. The method of hydrogenating bituminous materials which comprises heating in excess of 250 degrees C. under pressure in excess of about 50 atmospheres in the presence of iodine a metallic surface having the effect of iron whereby to activate the surface, and thereafter bringing a bituminous material substantially free of iodine into contact with said activated surface at a temperature in excess of 250 degrees C. and at a pressure of a hydrogen-containing gas in excess of 125 atmospheres.

5. The method of hydrogenating bituminous materials which comprises heating in excess of 250 C. in the presence of iodine and a hydrogen-containing gas at a pressure in excess of 50 atmospheres a metallic surface having the effect of iron whereby to activate the surface, and thereafter bringing a bituminous material substantially free of iodine into contact with said activated surface at a temperature in excess of 250 degrees C. and at a pressure of a hydrogen-containing gas in excess of 125 atmospheres.

6. The method of hydrogenating bituminous materials, which comprises causing a current of the bituminous material and hydrogen-containing gas to flow past a metallic surface having the effect of iron, the temperature being in excess of 250 degrees C. and the pressure in excess of 50 atmospheres, while introducing iodine into said current whereby to effect an activation of said surface, and thereafter continuing the flow of said current in the substantial absence of iodine therefrom while maintaining similar conditions of temperature and pressure.

7. The method of hydrogenating bituminous materials, which comprises causing a current of the bituminous material and hydrogen-containing gas to flow past a metallic surface having the effect of iron, the temperature being in excess of 250 degrees C. and the pressure in excess of 50 atmospheres, while introducing iodine into said current whereby to effect an activation of said surface, thereafter continuing the flow of said current under similar conditions of temperature and pressure, and subsequently intermittently introducing iodine into said current for maintaining the activation.

8. The method of hydrogenating bituminous materials which comprises heating in excess of 250 degrees C. under increased pressure in the presence of iodine a metallic surface having the effect of iron whereby to activate the surface, removing the excess of free iodine and thereafter bringing a bituminous material substantially free of iodine into contact with said activated surface at a temperature in excess of 250 degrees C. and at a pressure of a hydrogen-containing gas in excess of 125 atmospheres.

9. The method of hydrogenating bituminous materials which comprises heating in excess of 250 degrees C. under increased pressure in the presence of a compound containing dissociable iodine a metallic surface having the effect of iron whereby to activate the surface, and thereafter bringing a bituminous material substantially free of iodine into contact with said activated surface at a temperature in excess of 250 degrees C. and at a pressure of a hydrogen-containing gas in excess of 125 atmospheres.

10. In the hydrogenation of bituminous materials at a temperature in excess of 250 degrees C. and under high pressure in contact with a metallic surface having the effect of iron, the step of preactivating the surface which comprises subjecting it to heat and the pressure of a hydrogen-containing gas in the presence of iodine and in the absence of any hydrocarbon which is liquid at normal temperature and pressure, whereby to produce an activated surface which is substantially unaffected by treatment by washing with benzol or hot water.

11. In the hydrogenation of bituminous materials at a temperature in excess of 250 degrees C. and under high pressure in contact with a metallic surface having the effect of iron, the step of preactivating the surface which comprises subjecting it to a temperature in excess of 250 degrees C. and the pressure of a hydrogen-containing gas in excess of about 50 atmospheres in the presence of iodine and in the absence of any hydrocarbon which is liquid at normal temperature and pressure, whereby to produce an activated surface which is substantially unaffected by treatment by washing with benzol or hot water.

Signed at Cologne, Germany, this 28 day of February, 1931.

A. SPILKER.